Patented Feb. 24, 1942

2,274,416

UNITED STATES PATENT OFFICE 2,274,416

BREAD CHIP PROCESS

Glen Edson Junge, Fort Scott, Kans.

No Drawing. Application February 1, 1940,
Serial No. 316,806

2 Claims. (Cl. 99—86)

This invention forms a continuation in part of my application for patent filed April 20, 1939, Serial No. 269,009, and relates to a new cereal food product made by the redevelopment of the gluten in a baked loaf of wheat bread, the finished product being fried in hot grease and closely simulating the common and well-known potato chip. The finished bread "chip" has gustatory appeal and is palatable, but it may be made into a confection as by covering with a chocolate coating when it appears to be a nutmeat product, or it may be salted, like a potato chip, or otherwise treated. The commercial bakery has always had a problem in trying to make a profitable disposition of returned or day-old bread, usually called "stale" bread, but which is just as nutritious and perhaps even more digestible, than so-called "fresh" bread. The primary object of the invention, therefore, is to provide a new product and process whereby such "stale" bread may be prepared in "chip" form.

Various types of wheat bread cereals have been made such as toasted bread crumbs with added malt and other ingredients. Also, various methods have been devised, such as the toasting or frying of wheat bread slices, or reducing wheat bread to a dough or batter and then baking or frying the same. However, my new product in "chip" form, and its process of production, are entirely different from other bread cereals with which I am familiar, since my product cannot be produced from a loaf of wheat bread except by kneading or working of the bread under heavy pressure, as by passing it back and forth between steel rollers. The material is worked under pressure as by repeated roller passage, until it is reduced to a thin tenacious sheet of from $\frac{1}{64}$ to $\frac{1}{32}$ inch in thickness, the cellular or granular structure of the baked bread being entirely destroyed. The sheet when properly developed is very tenacious, resilient and elastic, and from visual and tactile examination I belief the gluten of the baked loaf of bread has been redeveloped or vivified. My reason for this conclusion is based on the above mentioned physical characteristics of the sheet and by its homogeneous appearance, no granular structure being present as possessed by all other cereal products with which I am familiar that are made of reprocessed baked wheat bread.

In the making of my product, the moisture content of the final sheet before frying, appears to be critical, dependent on the nature of the baked bread used as the raw material, since I believe that it is the moisture content that fixes the characteristic "chip" appearance of the finished product. If the moisture content is too great, when the sheet is fried, the result is a fragile grotesque product, ballooned out on both sides in great bubbles or blisters. This product is of no commercial value as a "chip," since it cannot be packed or handled without shortly being reduced to powdered condition. Again, if the moisture content of the sheet at the time of frying is too low, the resulting product is a thin, relatively tough wafer of smooth parchment or leather-like, repulsive appearance. This product can be packed and handled, but its toughness and appearance does not have a gustatory appeal, it is unpalatable, and it does not approximate a "chip" in appearance. However, when the moisture content is right at the time of frying, the resulting product is of true "chip" appearance, and it has gustatory appeal because of its light crisp appearance; and it is also very palatable as the esters in the bread are further oxidized by the frying operation. Both sides of the "chip" are covered with a multitude of small nodules, bubbles or blisters in almost contiguous relation, swelled out almost equally in nearly hemi-spherical shape on both sides of the "chip," the diameter of such balls or bubbles generally varying between $\frac{1}{8}$ and $\frac{1}{4}$ inch. The fact that my product blisters or swells on frying to form the hollow balls or bubbles is further evidence that the gluten has been redeveloped, since in the absence of gluten development, all baked or fried bread cereals with which I am familiar retain their characteristic granular or cellular appearance with no blister or bubble development.

My new product may be produced by following this procedure: I have found that "stale" bread on the average contains from 20% to 25% moisture by weight, and that by feeding such loaves, with or without prior maceration, back and forth between rollers under heavy pressure, the gluten may be redeveloped as a result of the heavy kneading or frictional action set up between the particles as they pass between the rollers or pressure applying means. If the moisture content of the bread is low, or if it is desired to lessen the working period of the bread for the redevelopment of the gluten, the process may be speeded up by increasing the moisture content of the bread to around 35% by weight. In other words, the moisture content of the bread is not at all critical, too little moisture requires a longer working or rolling of the bread, and too much moisture obviously will reduce the bread to an unuseable paste or will leave it with an excess amount of moisture which must be evaporated by a drying step, hereinafter described. Any skilled baker can readily determine by visual and tactile examination of the sheeted bread, when the gluten has been stretched, worked and redeveloped, by the tenacious character of the sheet and its resilience or elasticity, the sheet at this time having been made as thin as possible, preferably in the neighborhood of from $\frac{1}{64}$ to $\frac{1}{32}$ inch in thickness. As will be apparent however, the critical point is that the material shall possess such surface tenacity as to hold unexploded bubble surface, its thickness being of secondary importance.

The finished sheet, as a whole, or after being cut to desired shape or size, is now placed in a drier and its moisture content for the particular loaf of bread I used was reduced to such a point that the sheet retained approximately 5% to 12% moisture content by weight. In the drying operation, it is desirable to keep the temperature below 212° Fah., to prevent the generation of steam which may cause surface blistering, an undesirable result at this stage, as such a product when fried tends to absorb an undue quantity of grease.

After the material has been dried, it is fried in hot grease, sometimes called fat-frying or deep fat frying, at a temperature, preferably of between 350° and 380° Fah., which I found suitable with my dough. The desired bread "chip" product resulted, since there was just the right amount of moisture to produce the optimum blistered or pebbled surface, the tenacity or elasticity of the redeveloped gluten forming a film of sufficient strength to maintain the desired surface which has gustatory appeal and gives a light crisp appearance to the product, without making it so fragile as to powder on handling or packaging. It will be apparent from the above that the optimum "chip" possesses a degree of fragility between the extremely fragile product resulting from too much moisture, and the relatively tough leather-like product resulting from too little moisture. The optimum "chip" may be stored for relatively long periods of time without becoming rancid because it absorbs just sufficient grease to maintain its crisp nodular characteristics and to retain salt sprinkled thereon as in the manufacture of potato chips. To those skilled in the art it will also be readily apparent that the bubbled or blistered or nodular appearance on each side of the chips can be secured only in a product in which the tenacious resiliency or elasticity of the gluten has been well redeveloped.

I claim:

1. The method of producing a bread chip which comprises breaking down the cellular structure in a loaf of baked bread by kneading under pressure until the adhesiveness of the gluten has been developed to form a tough, non-granular, resilient, homogeneous dough, sheeting the dough, processing the dough to fix the percentage moisture content at such value that on expansion of the moisture innumerable spaced bubbles will be formed on the opposite sides of the chip, and hot grease frying said chip at such temperature as to expand its moisture content to form said bubbled surfaces.

2. The method of producing a bread chip which comprises breaking down the cellular structure in a loaf of baked bread by kneading under pressure until the adhesiveness of the gluten has been developed to form a tough, non-granular, resilient, homogeneous dough, sheeting the dough to $\frac{1}{64}$ to $\frac{1}{32}$ inch in thickness, processing the sheeted dough to fix the percentage moisture content at such value that on expansion of the moisture innumerable spaced bubbles will be formed on the opposite sides of the chip, and hot grease frying said chip at such temperature as to expand its moisture content to form said bubbled surfaces.

GLEN EDSON JUNGE.